United States Patent [19]
Smith

[11] Patent Number: 4,510,053
[45] Date of Patent: Apr. 9, 1985

[54] VAPOR DEGREASER APPARATUS

[75] Inventor: Jeffrey C. Smith, Prospect, Conn.

[73] Assignee: Branson Ultrasonics Corporation, Danbury, Conn.

[21] Appl. No.: 515,492

[22] Filed: Jul. 20, 1983

[51] Int. Cl.³ .............................................. B01D 15/00
[52] U.S. Cl. ..................................... 210/175; 210/256
[58] Field of Search .............. 210/167, 175, 187, 194, 210/197, 251, 689, 256, 172; 134/11, 31, 105

[56] References Cited
U.S. PATENT DOCUMENTS
533,424  2/1895  Baldwin .............................. 210/187
2,220,125 11/1940  Seaton .................................. 134/11

Primary Examiner—Ivars Cintins
Attorney, Agent, or Firm—Ervin B. Steinberg; Philip J. Feig

[57] ABSTRACT

An improved vapor degreaser apparatus includes means for selectively disposing a desiccator assembly within a conventional water separator for drying and removing excess water from a solvent.

3 Claims, 3 Drawing Figures

VAPOR DEGREASER APPARATUS

BACKGROUND OF THE INVENTION

The present invention concerns an improved vapor degreaser apparatus. Specifically, the invention concerns the provision of selectively disposing a desiccator assembly within a conventional water separator of a vapor degreaser apparatus for drying and removing water from a solvent in the vapor degreaser apparatus without the heretofore required additional piping. The desiccator assembly and water separator are designed for operation of the separator with or without the desiccator assembly and for the simple replacement of the desiccator assembly.

In a conventional vapor degreasing apparatus for cleaning or drying workpieces, solvent is boiled in a sump or chamber where it is vaporized. The resulting solvent vapor is subsequently condensed, usually by means of a cooling jacket or cooling coils to minimize the escape of the vapors into the atmosphere. The condensate is returned to the boiling sump or chamber. During the condensation cycle water is introduced into the system in various ways. For example, wet workpieces or cooling coils operating below the ambient dew point will introduce water into the solvent. It is well known that the introduction of water into cleaning solvents adversely affects solvent efficacy, and chemical stability, and, therefore, removal of water is required to maintain solvent integrity. Usually the water is removed prior to the solvent condensate being returned to the degreaser boiling sump.

One standard technique of water separation comprises the use of a gravity type separator. The solvent and water mixture, in which the solvent is usually heavier than the water, is allowed to remain in a relatively quiescent chamber for a period of time until the mixture separates into two distinct layers. This occurs, typically, in several minutes, e.g. three to five minutes, after which time the water phase floats on top of the solvent phase. Upon separation of the two components the water is decanted by conventional means from the surface and the substantially dry solvent is returned to the degreaser.

In certain cases, the conventional water separation procedure is potentially detrimental because of the nature of the solvent involved. Many degreasing applications require the use of solvents which are azeotropes consisting of a base solvent, usually a fluorocarbon, and a second component, such as an alcohol. The second component is soluble in water making removal of water difficult. If a standard gravity type separator is used, the water soluble component will be removed thereby causing the solvent to change its characteristics due to the constant leaching by the water.

In such cases, a desiccant material, such as a silica gel or molecular sieve, is used to remove the water. The desiccant chemical chosen possesses the ability to dry the solvent without removing the soluble component of the solvent. Typically, the water and solvent condensate mixture is passed through an external cannister filled with the desiccant before returning the dry solvent to the degreaser.

In most of the commercially available degreasers the water separator is supplied as an integral portion of the degreaser tank. If a solvent is used which requires a desiccant for drying, then an optional desiccator assembly is required. The desiccator assembly, including the cannister, is externally mounted and piped into the degreaser unit on a semi-permanent basis.

In the present invention, the water separator and desiccant drier are combined into a single unit thereby eliminating external piping if the desiccator option is required.

The desiccant drier cannister, in a preferred embodiment, includes a threaded pipe nipple. The drain pipe leading from the separator has a corresponding threaded pipe connection for receiving the threaded nipple of the desiccator cannister. With the addition of the desiccator cannister, the solvent will automatically pass through the desiccant bed prior to being returned to the boiling sump. If the user subsequently decides to use a solvent not requiring a desiccant for drying, the desiccator assembly can be unscrewed and removed and the degreaser will then include only the conventional gravity separator. Desiccator replacement is greatly facilitated in the present vapor degreaser design.

A principal object of the present invention is, therefore, the provision of an improved vapor degreaser apparatus.

Another object of this invention is the provision of an improved degreaser apparatus obviating the requirement for external piping to add a desiccator assembly.

A further object of this invention is the provision of an improved vapor degreaser apparatus having means for adding a removable desiccator assembly in the form of a desiccator cannister.

Further and still other objects of the present invention will become more clearly apparent when the following description is read in conjunction with the accompanying drawings.

DETAILED DESCRIPTION OF THE INVENTION

Figure 1:
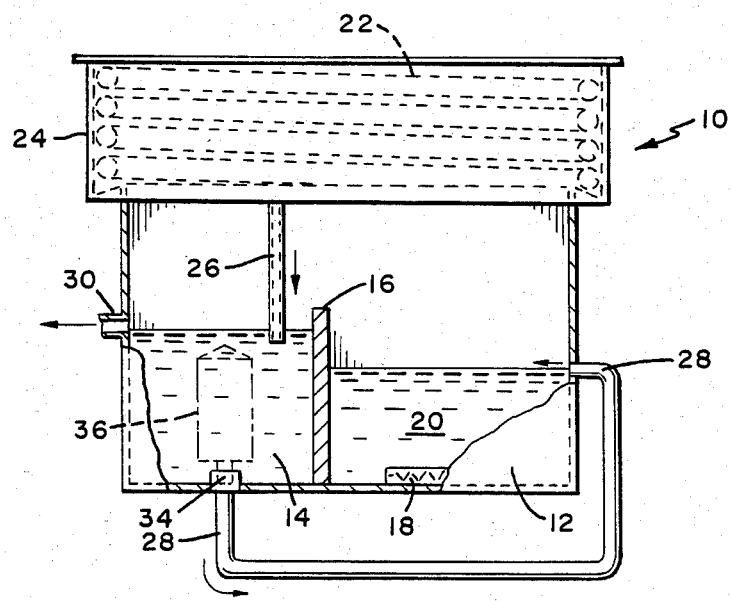
FIG. 1 is a side elevational view, partly in section, of a vapor degreaser apparatus.
Figure 2:
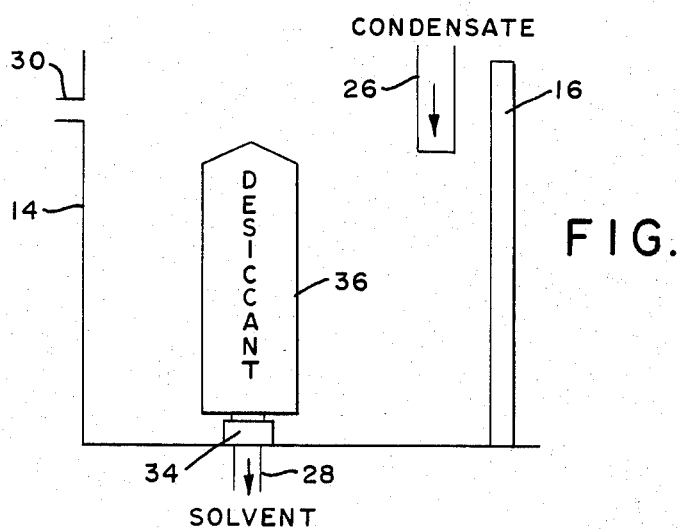
FIG. 2 is a representation of a conventional gravity type water separator with a desiccator assembly disposed therein in accordance with the present invention.

Referring now to the figures and to FIG. 1 in particular, there is shown a vapor degreaser apparatus 10 comprising a rectangular boiling sump 12 and an adjacent rectangular water separator sump 14 separated from one another by a vertical wall 16. The two sumps are disposed so that the solvent level in the water separator sump 14 will exceed the solvent level in the boiling sump 12, thereby causing solvent to flow from the separator sump 14 to the boiling sump 12 via pipe 28. The dimensioning of the two sumps, the inclusion of overflow pipes, drain pipes and valves are well known to those skilled in the art and have been omitted from the figure for simplicity sake.

Boiling sump 12 contains a heater 18 which causes solvent 20 in the sump to boil, thereby creating a vapor zone above the sump. In order to minimize vapor escaping into the atmosphere either from rising vapor or workpieces dragging vapors along, a cooling jacket or condensing coils 22 are circumferentially disposed around the inside of the upper portion 24 of the vapor degreasing apparatus 20. A condensate trough is disposed beneath the coils 22 to collect the solvent as it condenses and drips off the coils 22. The collected solvent is provided to the water separating sump 14 via pipe 26.

Water enters the solvent principally via two mechanisms. A workpiece disposed in the solvent 20 may contain water which will be removed from the workpiece and added to the solvent 20. Also, condensation may appear on a workpiece or the cooling coils 22 arising from ambient humidity. In either case, the addition of water to the solvent will reduce the cleaning efficacy of the solvent.

As described, a solvent and water mixture is provided to the sump 14 from pipe 26. After a relatively short period of time the solvent and water mixture in water separator sump 14 will separate into two distinct layers. Since the solvent is generally heavier than the water, the top layer of the mixture will be water which is decanted through pipe 30 by conventional means and is otherwise removed from the system. The lower layer of solvent is fed into pipe 28 and flows to the input of boiling sump 12.

In many degreasing applications the above described vapor degreasing apparatus performs acceptably and separates water from solvent to maintain system cleaning efficiency. However, certain degreasing applications require the use of azeotropes. An azeotrope is a mixture of two or more liquids whose vapor is of the same composition as the boiling liquid. An azeotrope is usually a fluorocarbon base solvent and a water soluble second component, such as alcohol. When such an azeotrope is used in a vapor degreasing apparatus the above described water separating apparatus is inadequate. If the above described arrangement were used, the water soluble component will be removed in the separator and over time the solvent will change its characteristics because of the leaching by the water.

In order to overcome this disadvantage it is well known to include a desiccator assembly in the apparatus. The desiccator assembly comprises an open top cannister filled with desiccant material, such as silica gel or molecular sieve, which has the ability to dry the solvent without removing the water soluble component of the azeotrope. Usually, the desiccator assembly is externally coupled to the degreaser apparatus at a location to cause the water and solvent condensate in pipe 26 to pass through the desiccator assembly prior to the mixture entering the sump 14. This arrangement results in a desiccator assembly which is piped into the apparatus in a semi-permanent manner. Therefore, if a non-azeotrope solvent is subsequently used in the degreaser apparatus, the desiccator assembly will remain a part of the apparatus.

The improvement found in the present invention resides in the provision of means for selectively disposing a desiccator assembly directly within the water separating sump 14 without the addition of external piping. To this end, in a preferred embodiment, the pipe 28 is joined to the bottom plate of the sump 14 with a screw tapped fitting 34. The generally cylindrical shaped desiccator assembly 36 also includes a screw tapped fitting at its bottom surface. When an azeotrope solvent is used or at any other time when a cleaning operation requires a desiccator assembly, the desiccator assembly is joined to the end of pipe fitting 34 by means of its threaded fitting. It will be apparent that the desiccator assembly can be added or removed or replaced by merely unscrewing or screwing in the desiccator assembly 36.

The water separating sump 14 performs in the same manner as before with regard to receiving the solvent and water mixture. However, with the inclusion of the desiccator assembly, water is no longer decanted via pipe 30, for example by disposing a plug in an end of the pipe 30, leaving solvent to be returned via pipe 28 to the boiling sump 12. Rather the solvent and water mixture overflows into the open top of the cannister 36 and travels downward through the desiccant to the fitting 34 and pipe 28. In order to retain the desiccant material within the cannister 36, the desiccant material may be disposed in a porous pouch or other suitable perforated container. The desiccant dries the solvent as described above and dry solvent is resupplied to the sump 12 via pipe 28 to replenish spent solvent.

Figure 3:
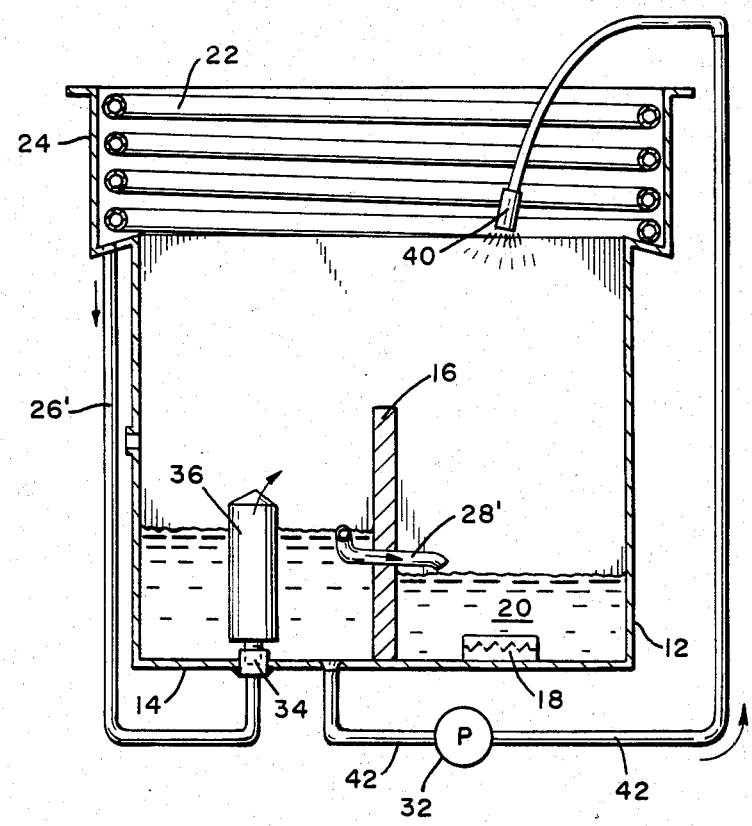
FIG. 3 is a representation of a vapor degreaser apparatus of an alternative construction.

FIG. 3 illustrates an alternative embodiment of the present invention which is particularly advantageous for use with a vapor degreaser apparatus which includes means for spraying a workpiece with solvent. The solvent and water mixture collected in the condensate trough is provided by means of inlet pipe 26' to fitting 34 disposed at the bottom of the water separator sump 14. A desiccator assembly 36 is coupled to the fitting 34. The water contaminated solvent flows upward, through the desiccant wherein the water is removed. The dry solvent overflows the top of the desiccant assembly 36 filling the water separator sump 14 with dry solvent. Dry solvent is provided from the separator sump 14 via drain pipe 28' passing through the wall 16 to the boiling sump 12. Alternatively, dry solvent can be provided from the separator sump 14 to the boiling sump 12 via an aperture in the wall 16. In addition a flexible tubing 42 is connected at one end to the bottom of separator sump 14 and terminates at its other end in a spray nozzle 40. A pump 32 is coupled in the line of the tubing 42 for providing the dry solvent at the spray nozzle 40. The dry solvent is sprayed from nozzle 40 onto a workpiece in order to dry or degrease the workpiece.

In the above apparatus, a moisture sensing device may be disposed in the pipe 28 or 28' for sensing the water content of the dry solvent. This sensing allows for monitoring the desiccant condition.

It will be understood that the water separator sump and the separate use of a desiccator assembly are both known in the prior art. The improvement provided is the coupling of the desiccator assembly to the vapor degreasing apparatus within the water separator sump in a simple, efficient manner without the addition of external piping. Depending upon the application, the user is able to readily install or remove the desiccator assembly from the unit. Additionally, replacement of cannisters is also facilitated. The use of a pouch, for example, to retain the desiccant within the cannister 36 simplifies removal and replacement of only the pouch through the open top of the cannister for subsequent regeneration of the desiccant. In practice and depending upon operating conditions, the desiccant material must be regenerated approximately weekly.

It will be noted that the present invention is applicable to multi-sump systems where there is a water separator sump. Additionally, the present invention is applicable to systems in which the water separator sump is not included within the vapor degreaser apparatus but where an external water separator fed from the condensate trough is used. In the latter case the desiccator assembly can be disposed in the external water separator in the same manner as described above.

It will be apparent that while in the preferred embodiment a screw attachment is described, a force fit between a fitting extending from the cannister into the fitting of pipe 28 or any other leak-proof direct coupling of the desiccator assembly within the water separator sump is also comprehended by the invention.

Furthermore, many variations may be made to the vapor degreaser apparatus, such as the inclusion of additional cascading rinse sumps or the addition of ultrasonic energy producing means to a boiling or rinse sump for improving cleaning or drying of workpieces.

While there have been described and illustrated a preferred embodiment of a vapor degreaser apparatus having a desiccator assembly and several variations and modifications thereof, it will be apparent to those skilled in the art that further and still other variations and modifications may be made without deviating from the broad scope of the invention which shall be limited solely by the scope of the appended claims.

What is claimed is:

1. A vapor degreaser apparatus comprising a boiling sump and a water separator sump and including a drain pipe for removing dry solvent from said water separator sump and returning said dry solvent to said boiling sump, wherein the improvement comprises:
   a desiccator assembly disposed in said separator sump for receiving water contaminated solvent in said separator sump and discharging dry solvent for use in said boiling sump.

2. A vapor degreaser apparatus comprising a boiling sump and an adjacently disposed water separator sump, a drain pipe terminating in said water separator sump for removing dry solvent from said water separator sump and returning said dry solvent to said boiling sump, and a desiccant assembly mounted in said water separator sump and operative for receiving water contaminated solvent in said separator sump and discharging dry solvent from said desiccator assembly though said drain pipe to said boiling sump.

3. A vapor degreaser apparatus as set forth in claim 2, said desiccant assembly being removably mounted to the end of said drain pipe terminating in said water separator sump.

* * * * *